Figure 1:
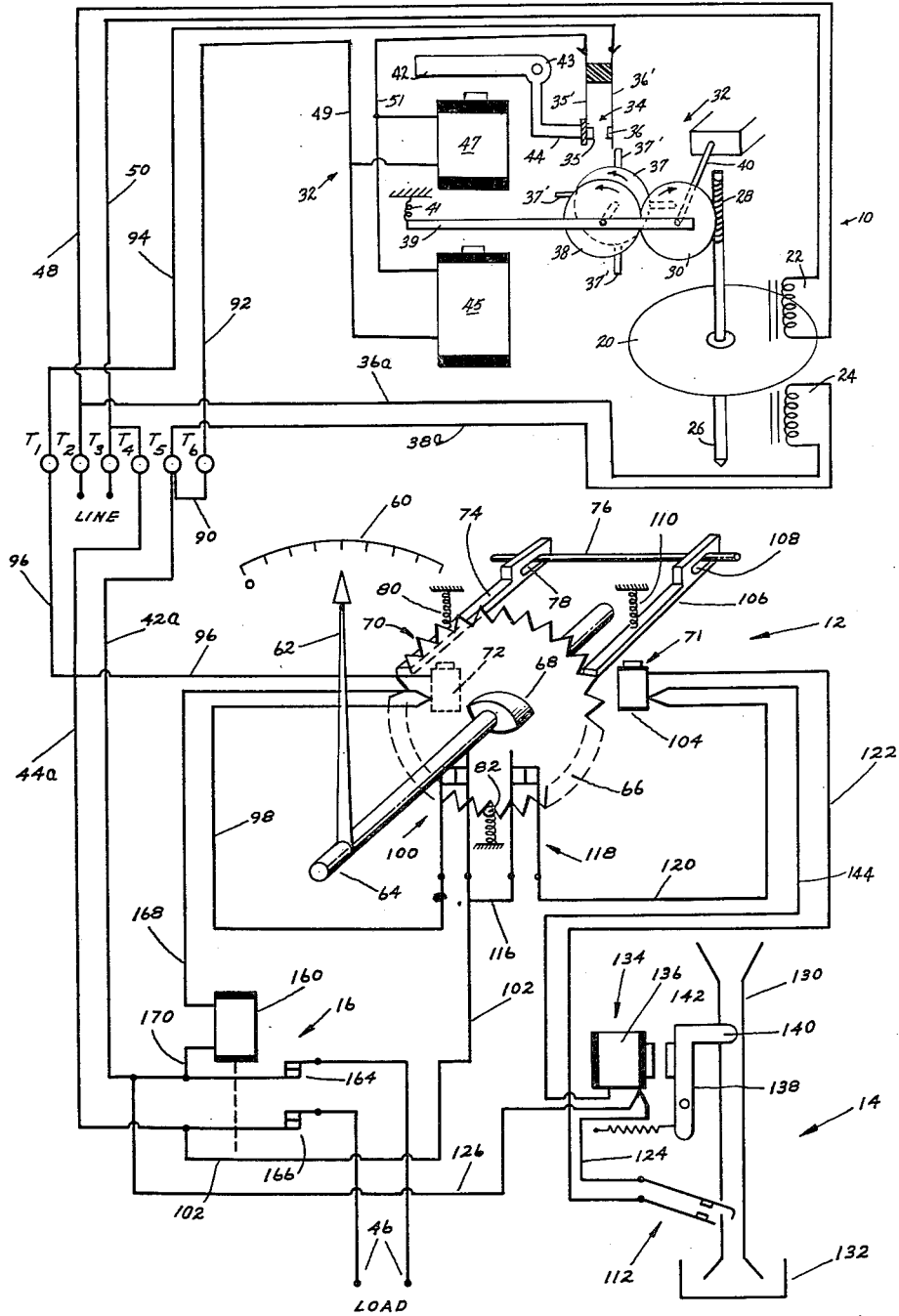

Nov. 20, 1962

J. C. DAVIS 3,064,787

PREPAYMENT WATT-HOUR METER

Filed Sept. 9, 1959

2 Sheets-Sheet 1

INVENTOR.
John C. Davis
BY

Nov. 20, 1962     J. C. DAVIS     3,064,787
PREPAYMENT WATT-HOUR METER

Filed Sept. 9, 1959     2 Sheets-Sheet 2

INVENTOR.
John C. Davis

_United States Patent Office_

3,064,787
Patented Nov. 20, 1962

1

3,064,787
PREPAYMENT WATT-HOUR METER
John C. Davis, 44 Starr Lane, Jamaica Plain 30, Mass.
Filed Sept. 9, 1959, Ser. No. 838,999
3 Claims. (Cl. 194—11)

This invention relates to an electrically operated prepayment watt-hour meter.

The primary object of my invention is to provide a prepayment watt-hour meter which is extremely reliable.

Another important object of my invention is to provide a prepayment watt-hour meter which operates electrically in the vending of electrical energy.

Another important object of my invention is to provide a prepayment watt-hour meter for vending energy which can readily be altered or adjusted to different rates of sale.

Another important object of my invention is to provide a prepayment watt-hour meter in which the watt-hour registering element constitutes a readily replaceable component of the entire assembly. The advantages inherent in this feature of the prepayment watt-hour meter are several: First, the watt-hour registering element may consist of a standard watt-hour meter with minor modifications, and these are now in quantity production by several manufacturers at reasonable cost and high quality. Second, the watt-hour meter component of the prepayment assembly may readily be removed for testing or replacement. Third, the watt-hour meter component of the prepayment assembly may be selected to suit the type of power circuit and magnitude of load current which is to be measured, and may at any time be replaced with another to suit altered conditions of the circuit or load without altering or disturbing the rest of the prepayment assembly. This advantage will appear in the expediency of the work involved in such change at the point of installation, and what is probably more important, will reduce inventory in reserve stocks, inasmuch as complete prepayment assemblies need not be carried for each and every circuit and load condition to be encountered. Fourth, the watt-hour meter component of the prepayment assembly can be located remote from the rest of the assembly, by the installation of a pilot circuit between the location best suited for coin insertion, coin registrations, and coin collection, and the location best suited to metering and controlling the power circuit.

To accomplish these and other objects, my invention includes an indicating meter having a visible scale and a movable pointer. The pointer indicates on the scale the credit purchased by a customer. As energy is consumed by the customer, the indicating pointer moves down the scale until it reaches a point indicating that the customer has consumed all of the energy credited to his account, whereupon means carried by the pointer or needle opens a limit switch which effects the release of a contactor preventing further power from being drawn by the customer.

As another feature of my invention, means are provided to move the pointer up the scale indicating that additional credit has been purchased by the customer as he deposits coins in a collection box. As the coins are directed through a chute into the box, a stepper assembly moves the pointer unit by unit up the scale. When the pointer reaches a point on the scale beyond which it is incapable of registering additional credit, a switch is opened causing a blocking device to close the chute so that no additional coins may be inserted. The same result is obtained when a power failure occurs.

In the illustrated embodiment of my invention, the switch which causes the needle to move step by step down the scale as energy is consumed by the customer is controlled by a sprocket carried by a pivotally supported armature and a pair of electromagnets. As will be more fully appreciated from the detailed description, the switch is caused to close and immediately open each time it is actuated by the watt-hour meter forming part of the assembly. With this arrangement, it is impossible for the indicating needle to be moved down the scale except when energy is actually drawn by the customer.

Figure 2:
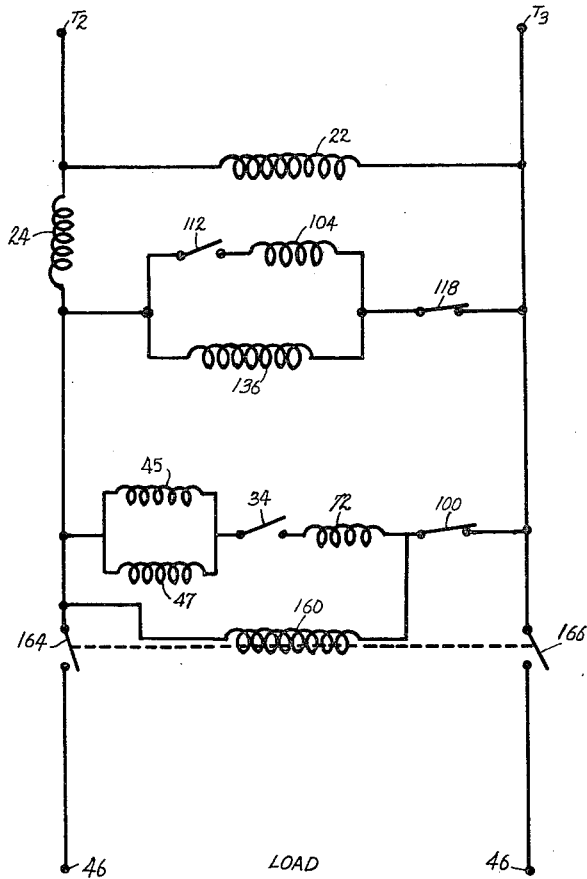

These and other objects and features of my invention along with its incident advantages will be better understood and appreciated from the following detailed description read in connection with the accompanying drawing in which:

FIGURE 1 is a diagrammatic view, partially schematic, showing one embodiment of a prepayment watt-hour meter constructed in accordance with my invention; and FIGURE 2 is an elementary schematic diagram of the circuit of FIGURE 1.

The embodiment of my invention shown in FIGURE 1 includes in its general organization a watt-hour meter 10, an indicator and stepper assembly 12, a coin collecting unit 14, and a contactor 16. Each of the several components are of conventional design with the exception of the contact device which forms an accessory of the watt-hour meter and they will be described separately in the following paragraphs. Thereafter, the operation of the combination will be presented.

The watt-hour meter 10 conventionally includes a rotatable disc 20 driven by a potential coil 22 and a current coil 24 disposed on opposite sides of the disc. The disc 20 rotates when both of the coils are energized and drives a shaft 26 which in conventional use operates a meter register (not shown). A worm 28 is formed on the shaft 26 and drives a gear 30 which forms part of a contact device 32 having a switch 34. The contact device 32 is described and forms part of the invention disclosed in my copending application Serial No. 803,269 filed March 31, 1959 entitled Contact Device.

The switch 34 includes a pair of contacts 35 and 36 carried by flexible blades 35' and 36'. The blade 36' extends downwardly below the contact 36 and lies in the path of the blades 37' of the sprocket 37. The sprocket 37 is secured to a common shaft with a gear 38 which is driven by the gear 30. Thus, rotation of the worm 28 causes the sprocket 37 to rotate and as each of its blades 37' engages the lower portion of the switch blade 36', the blade 36' moves to the left as shown in the drawing and closes the contacts 35 and 36. Thus, the sprocket 37 serves as the switch actuator in the contact device.

The gear 38 and sprocket 37 are carried by an armature 39 pivotally supported on the end of an axle 40 which supports the gear 30. The armature 39 is biased to the position illustrated by a spring 41. A second armature 42 pivotally supported on a pin 43 has an actuating arm 44 formed at one end which engages the blade 35' of the switch 34. The armature 39 is controlled by a coil 45 energized through a circuit dominated by switch 34, and the second armature 42 is controlled by a coil 47 also dominated by the same switch.

As the worm 28 of the watt-hour meter 10 drives the sprocket 37 in the direction of the arrow through the gear train composed of gears 30 and 38, the sprocket blades 37' engage the lower end of switch blade 36' moving the contacts 35 and 36 into engagement. The closing of switch 34 connects the coils 45 and 47 to a power source described in detail below through the leads 49 and 51. The coil 47 is wound so as to be more responsive to the initial flow of current and causes the armature 42 to pivot about its mounting 43 in a counter clockwise direction. Moved in that direction, the actuator 44 of the armature 42 pushes the blade 35' carrying the contact 35 to the right so that the contacts are held firmly together. The firmer closing of the contacts causes more current to flow in the coil circuit and coil 45 attracts the armature 39 against the bias of the spring 41. As the armature 39 moves downwardly to the pole piece of the coil 45, the sprocket 37 carried on the armature moves downwardly with it and allows the blade 36' of the switch 34 to step over the sprocket blade 37' and thus is released. The release of the switch blade 36' causes the contact 36 to move out of engagement with the contact 35 and the circuit of the coils 45 and 47 in opened. The de-energized coils 45 and 47 release their respective armatures 39 and 42 so that the device returns to the position illustrated. No false repetition of the closing of the contacts 35 and 36 may occur and arcing and chattering are eliminated. The actuator arm 44 forming part of the armature 42 insures a positive tight closing of the switch 34 and the release of the switch blade 36' by the step-under action of the sprocket blade 37' insures a clean opening of the contacts. It will also be appreciated that because the armature 39 is pivotally supported coaxially with the gear 30, movement of the armature 39 will not cause disengagement of the gears 30 and 38. Moreover, the arcuate movement of the sprocket 37 with the gear 38 on the armature 39 further enables the blade 36' of the switch to step-over the actuating blade 37' of the sprocket.

At this point it should be understood that the gears 30 and 38 may be replaced by gear trains of various reduction ratios as desired to accommodate watt-hour meters of various disc constants and to produce signals representing the desired rate of payment.

As power is consumed by a customer, the potential and current coils 22 and 24 become energized and through the intermediate assembly cause the sprocket 37 to rotate. It will be noted that the current coil 24 is connected by leads 36a and 38a to terminals $T_2$, $T_5$ and $T_6$. The terminals $T_2$ and $T_3$ are connected directly to the main line. Leads 42a and 44a connected respectively to terminals $T_5$ and $T_4$ provide power to the load connections 46 which may represent the customer's electrical outlet. Thus, a potential is applied across the load connections 46 from the line through the circuit which may be traced from terminal $T_2$ through lead 36a, the current coil 24, the lead 38a, and the lead 42a on one side and from terminal $T_4$, which is directly connected to terminal $T_3$, and lead 44a on the other side. The potential coil 22 is connected by means of leads 48 and 50 across the line in parallel with the load terminals.

The illustrated indicator and stepper control 12 which is essentially a differential device in the form of a rotary ledger includes a scale 60 and a pointer 62. The pointer 62 is carried on a shaft 64 and moves up and down the scale in response to angular movement of the shaft. A star wheel 66 and a cam 68 are mounted on the shaft 64. The star wheel 66 is controlled by a pair of actuators 70 and 71 which are arranged to turn the wheel and the shaft 64 in opposite directions. The actuator 70 includes a coil 72 and an armature 74 which may be termed a debit solenoid engages the teeth of the star wheel. The armature 74 is pivotally supported on a pin 76 which extends through a slot 78 at the rear end of the armature, and the armature is biased to a raised position by a spring 80. Energization of the coil 72 draws the armature 74 downwardly against the bias of the spring 80 and causes the star wheel 66 to step in a counter clockwise direction and move the pointer one unit down the scale 60. A ball detent 82 engages the star wheel 66 and limits the effect of the armature so that the wheel turns only one step in reaction to each actuation of the coil 72.

The coil 72 is energized by the closing of switch 34 controlled by the sprocket 37. The circuit for the coil 72 conveniently termed a debit circuit may be traced from the power terminal $T_2$ through lead 36a, coil 24, lead 38a to the terminal $T_5$, lead 90 connected to terminal $T_6$, lead 92 to switch 34, lead 94 to the terminal $T_1$, and lead 96; and out of the coil 72 through lead 98, a limit switch 100, lead 102, lead 44a to the terminal $T_4$, and to the power terminal $T_3$. Thus, each time the switch 34 closes under the influence of the sprocket 37, the coil 72 is momentarily energized and causes the armature 74 to turn the star wheel 66 one step in a counter clockwise direction.

The actuator 71 disposed on the other side of the star wheel 66 is adapted to turn the pointer 62 upwardly on the visual scale 60 in the direction of the maximum. The actuator 71, just like the actuator 70 includes a coil 104, an armature 106 pivotally supported on the pin 76 which extends through a slot 108 on the rear of the armature, and a spring 110 which biases the armature to a raised position. The coil and armature may collectively be designated the credit solenoid. Each time the coil 104 is energized, it draws its armature 106 downwardly and its end engaging the teeth of the wheel turns the wheel and pointer clockwise up the scale. The detent 82 limits this stepping movement of the wheel 66 to one unit on each actuation of the armature. The coil 104 is energized each time the switch 112, forming part of the coin collector 14, is closed. The credit circuit for the coil 104 may be traced from the power terminal $T_3$ to the terminal $T_4$, through leads 44a and 102, lead 116 to the second limiting switch 118, and lead 120; and out of the coil 104 through lead 122 to the switch 112, the lead 124, lead 126 to the lead 42a which is connected to the terminal $T_5$, and through leads 38a, coil 24 and lead 36a to the other power terminal $T_2$.

Although I have described in detail the particular stepper control illustrated, it is to be understood that this device may take other forms. For example, the stepper could include two pawl and ratchet assemblies and an intermediate differential gear assembly. The pointer would be carried by the differential and indicate on the scale the accumulated difference between the motions imparted to the ratchets.

It will be noted from FIGURE 1 that when the pointer 62 moves to the left end of the scale, the cam 68 carried on the shaft 64 opens the limit switch 100 and when the pointer moves to the other extreme on the scale, the cam 68 opens the limit switch 118. The manner in which the limit switches operate to prevent further consumption of energy and the insertion of unregisterable coins will be described fully in connection with the operation of the device.

The coin collector 14 shown diagrammatically in FIGURE 1 includes a chute 130 through which coins are directed by the customer when he purchases energy. When the coins are dropped into the chute 130 and are allowed to pass through it to the coin collection box 132, they actuate the switch 112 so that it momentarily closes. As has been suggested earlier, when the switch 112 is closed, the coil 104 energizes causing the needle to move one step up the scale. If as has been suggested, the customer has purchased a maximum amount of credit indicated by the pointer 62 reaching the extreme right on the scale 60, a stop provided as part of the coin collector prevents the introduction of additional coins into the chute. This stop forms part of a sub-assembly 134 which includes a solenoid 136 and an armature 138. The armature has a flange 140 formed at one end which is adapted to extend into the chute 130 through an opening 142 provided in its side. When the coil 136 is de-energized, the armature 138 is released to the position illustrated and the flange 140 extends into the chute. When the coil 136 is energized, the armature is drawn to the left as viewed in the drawing and the flange 140 is removed from the chute. When the flange is withdrawn, coins may be dropped into the chute to actuate the switch 112. It is clear that just so long as the customer has less than the maximum credit, the stop 140 should not prevent the introduction of coins into the chute, and the customer should be allowed to purchase additional credit. Therefore, the solenoid 136 should remain energized just so long as the pointer 62 has not reached full scale deflection. The coil 136 is dominated by the limit switch 118 and while that switch remains closed, the coil 136 remains energized. The circuit for the coil 136 may be traced from the power terminal $T_3$ through the power terminal $T_4$, the leads 44a, 102 and 116, switch 118, leads 120 and 144 to one side of the coil 136; and back to the other power terminal $T_2$ through leads 126 and 42a to the power terminal $T_5$, and through the leads 38a and 36a interrupted by the coil 24, to the terminal $T_2$.

To complete the description of the assembly shown in FIGURE 1, it is only necessary to describe the contactor 16. This contactor is employed to prevent the further drawing of energy through the assembly when the pointer and scale indicates that the customer has consumed all of his purchased credit. The contactor includes a relay coil 160 which opens and closes the contacts 164 and 166 upon de-energization and energization, respectively. The circuit for the coil 160 may be traced from the power terminal $T_3$ through terminal $T_4$, the leads 44a and 102, through the limit switch 100, leads 98 and 168 to one side of the coil 160; and out the other side of the coil 160 through the lead 170, leads 42a and 38a, coil 24, and the lead 36a to the other power terminal $T_2$. Thus, it will be appreciated that if the limit switch 100 opens, the coil 160 becomes de-energized and opens the circuit breaker contacts 164 and 166.

In an alternative embodiment of my invention, the contactor 16 could be replaced by a conventional circuit breaker having a shunt trip coil dominated by the limit switch 100. The coil 160 could serve as the shunt trip coil in the circuit breaker and the limit switch 100 in this embodiment should be converted to a normally open switch which is closed upon depletion of the credit purchased by the customer. In such an arrangement, closing of the limit switch 100 would cause the shunt trip coil 160 to energize which in turn would cause the circuit breaker to trip, opening the load circuit. Use of this arrangement would serve to combine over-current protection with the other features of the assembly.

In operation, the assembly shown in FIGURE 1 is connected to a power supply at terminals $T_2$ and $T_3$ and the load terminals 46 are connected to the customer's outlet. Assume that the pointer 62 is at the extreme left indicating that no credit has been purchased by the customer. Also assume that the credit is purchased in five cent units. As the customer drops each five cent piece into the chute 130, the switch 112 is momentarily closed. The closing of the switch 112 causes energization of the coil 104 and the armature 106 moves the star wheel 66 one step and the pointer 62 moves up the scale one step to the right indicating that the customer has purchased one unit of energy. Additional coins may be deposited by the customer in the chute 130 until the pointer 62 reaches full scale deflection indicating that maximum credit has been purchased. At that time, the cam 68 opens the switch 118 causing de-energization of the coil 136. When the coil 136 is de-energized, the flange 140 moves into the chute, as illustrated, and prevents the customer from depositing additional coins.

Having purchased credit, the customer is free to consume energy as he desires up to the amount purchased. Because the needle 62 has moved up the scale off the zero position, the limit switch 100 is closed and the contactor coil 160 is energized. As a result, the contactor switches 164 and 166 are closed permitting energy to be drawn by the load. As the customer draws energy, the watt-hour meter 10 operates causing the sprocket 37 to rotate. The sprocket 37 causes the switch 34 to close each time it is engaged by one of the sprocket teeth. Immediately thereafter, the step-over coil 45 causes the switch 34 to open. Each time the switch 34 closes, the coil 72 momentarily energizes and causes the armature 74 to turn the star wheel 66 counter clockwise and move the pointer 62 down the scale. Because the sprocket 37 rotates at a speed proportional to the rate that energy is consumed by the purchaser, each actuation of the wheel 66 may indicate that a unit of energy or some fractional part thereof as determined by the vendor, has been consumed. As the customer continues to draw energy through the assembly, the needle 62 moves down the scale until it reaches the zero position at which time the cam 68 opens the limit switch 100. When the limit switch 100 is opened, the contactor coil 160 is de-energized and the switches 164 and 166 open.

It will of course be understood that the customer need not wait until the needle reaches a zero position to purchase additional credit. Just so long as the needle does not indicate that the maximum credit has been purchased, the customer may buy more credit merely by inserting coins into the chute 130, for the stop 140 will not interrupt the chute.

Those skilled in the art will appreciate that it is of utmost importance to provide a dependable and precise actuating mechanism for the switch 34 causing it to close and open cleanly as energy is consumed. For example, the switch 34 must not be allowed to remain closed when a customer ceases to draw energy even though a tooth of the sprocket is in a position to engage the switch. If this occurred, the coil 72 could continuously actuate the armature and move the pointer 62 down the scale, although no energy is being drawn from the load terminals 46. Chattering or arcing of the contacts of the switch 84 is even more likely to cause such difficulties. The contact device 32 shown in FIGURE 1 as an adjunct of the watt-hour meter 10 is adapted to provide positive closing and opening of the switch 34 to avoid improper charging against the credit purchased by the customer.

Although I have illustrated and described but one embodiment of my invention in detail, those skilled in the art will appreciate that numerous modifications may be made of my invention without departing from its spirit. For example, I have indicated that all of the components of my invention are of conventional design and in regular production today, with the exception of the contact device 32 illustrated as an accessory of the watt-hour meter 10. Therefore, while I have diagrammatically illustrated specific makes of each component, other equivalent and conventional makes may be substituted for those illustrated in the combination without departing from my invention. Moreover, most of the control functions performed by the several components may be served either by a normally de-energized or a normally energized circuit simply by using normally open or normally closed contacts, respectively, and suitable mechanical arrangements of the coils and controlled devices. Furthermore, while I have illustrated my prepayment watt-hour meter as employed in a simple two wire system, it is to be understood that it has application and may be used in more complex systems such as 110/220 volt three wire single phase or three phase circuits, or in a three wire branch from a three phase four wire circuit for greater reliability and versatility.

In view of the numerous modifications suggested above which will be apparent to those skilled in the art in the light of the foregoing description, I do not intend to limit the scope of my invention to the single embodiment illustrated and described. Rather, it is my intention that the breadth of my invention be determined by the appended claims and their equivalents.

What I claim as new and desire to secure by Letters Patent of the United States is:

1. A prepayment watt-hour meter comprising an outlet, a circuit for connecting the outlet to an energy source, a first switch for opening and closing said circuit, a scale, a pointer carried by a shaft and movable across the scale, a pair of actuators one adapted to rotate the shaft in one direction and the other of the actuators adapted to turn the shaft in the other direction, a meter including a rotatable member which rotates in response to energy being drawn through the circuit, a sprocket which rotates in response to rotation of said member, a second switch in the path of the teeth of the sprocket and closed as each tooth engages it, coils adapted to operate each of the actuators, circuits for energizing each of the coils, one of the circuits including said second switch and energizing its coil in response to closing of that switch causing said pointer to move down the scale, a coin collector, a chute for introducing coins into the collector, a third switch closed in response to the passage of a coin down the chute, said third switch controlling the other circuit and causing the other coil to energize in response to the closing of that switch, energization of that coil causing one actuator to move the pointer up the scale, a fourth switch actuated when the pointer reaches the lowermost end of the scale, means responsive to the closing of the fourth switch for opening the first switch, and another switch actuated in response to the pointer reaching the uppermost end of the scale for closing said chute.

2. A prepayment watt-hour meter comprising an outlet, a circuit for connecting the outlet to an energy source, a first switch for opening and closing said circuit, a scale, a pointer carried by a shaft and movable across the scale, a pair of actuators one adapted to rotate the shaft in one direction and the other of the actuators adapted to turn the shaft in the other direction, a meter including a rotatable member which rotates in response to energy being drawn through the circuit, a sprocket which rotates in response to rotation of said member, a second switch in the path of the teeth of the sprocket and actuated as each tooth engages it, coils adapted to operate each of the actuators, circuits for energizing each of the coils, one of the circuits including said second switch and energizing its coil in response to actuation of that switch causing said pointer to move down the scale, a coin collector, a chute for introducing coins into the collector, a third switch actuated in response to the passage of a coin down the chute, said third switch controlling the other circuit and causing the other coil to energize in response to the actuation of that switch, energization of that coil causing one actuator to move the pointer up the scale, a fourth switch actuated when the pointer reaches the lowermost end of the scale, means responsive to the actuation of the fourth switch for opening the first switch, and another switch actuated in response to the pointer reaching the uppermost end of the scale for closing said chute.

3. A prepayment watt-hour meter comprising an outlet, a circuit for connecting the outlet to an energy source, a first switch for opening and closing said circuit, a scale, a pointer carried by a movable member and movable across the scale, a pair of actuators one adapted to move the member in one direction and the other of the actuators adapted to move the member in the other direction, a meter including means which moves in response to energy being drawn through the circuit, a second switch in the path of the means and periodically actuated as the means moves, coils adapted to operate each of the actuators, circuits for energizing each of the coils, one of the circuits including said second switch and energizing its coil in response to actuation of that switch causing said pointer to move down the scale, a coin collector, a chute for introducing coins into the collector, a third switch actuated in response to passage of a coin down the chute, said third switch controlling the other circuit and causing the other coil to energize in response to actuation of that switch, energization of that coil causing one actuator to move the pointer up the scale, a fourth switch actuated when the pointer reaches the lowermost end of the scale, means responsive to the actuation of the fourth switch for opening the first switch, and another switch actuated in response to the pointer reaching the uppermost end of the scale for closing said chute.

References Cited in the file of this patent

UNITED STATES PATENTS

| | | |
|---|---|---|
| 796,062 | Duncan | Aug. 1, 1905 |
| 873,356 | Dowling | Dec. 10, 1907 |
| 1,588,581 | Ingram et al. | June 15, 1926 |
| 2,081,046 | Wall | May 18, 1937 |
| 2,612,976 | Harper et al. | Oct. 7, 1952 |

FOREIGN PATENTS

| | | |
|---|---|---|
| 509,939 | Great Britain | July 25, 1939 |